May 10, 1932.   D. P. GLEASON   1,857,372
UTENSIL
Filed Nov. 15, 1930   2 Sheets-Sheet 1
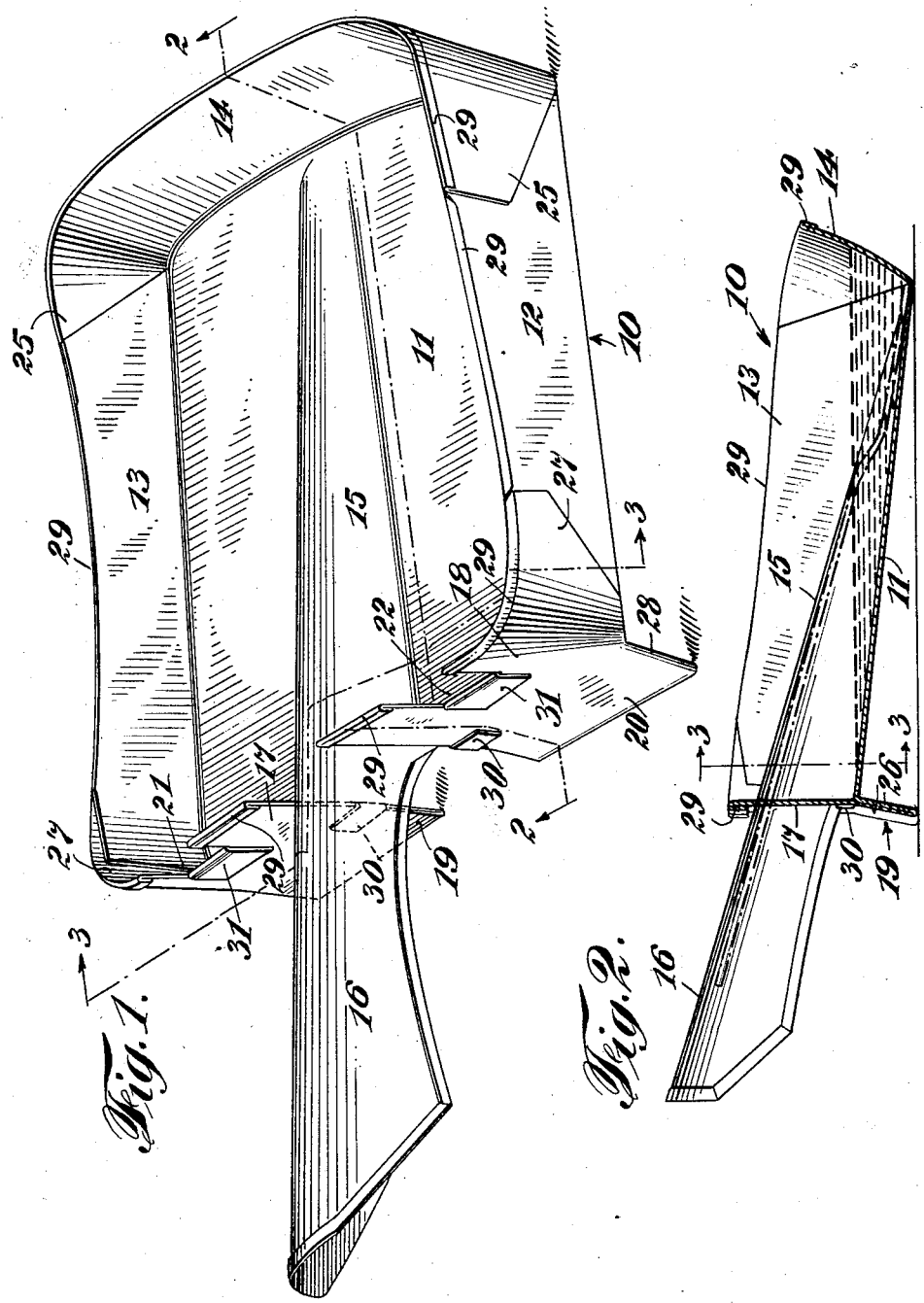
INVENTOR
Dora P. Gleason
BY
Ramsey & Kent
her ATTORNEYS

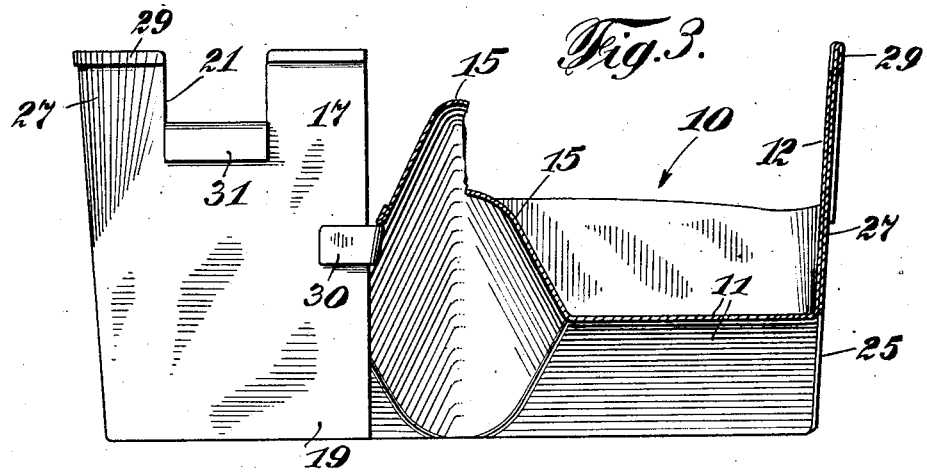
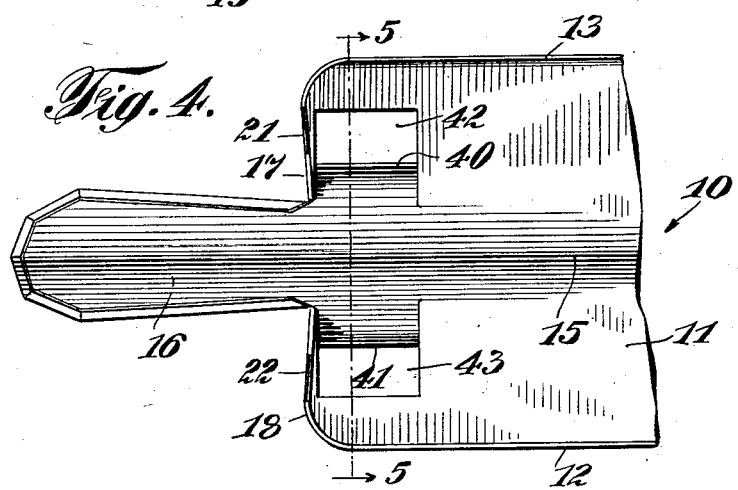
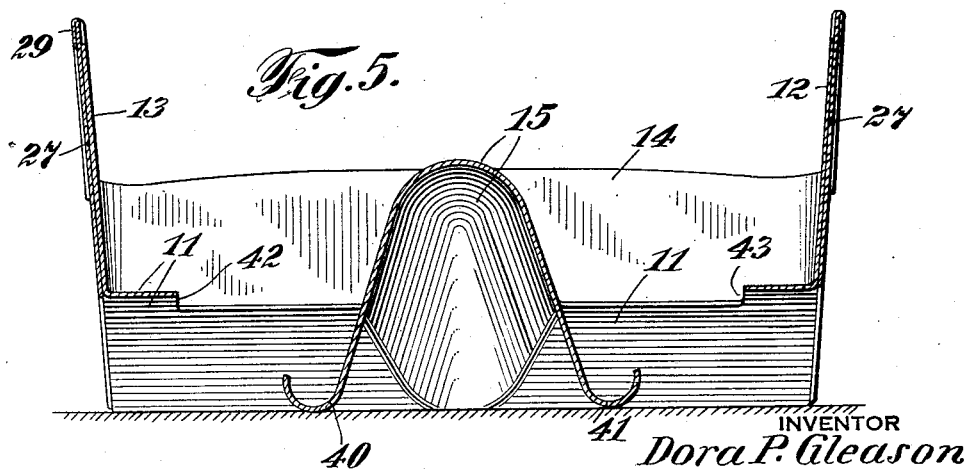

Patented May 10, 1932

1,857,372

UNITED STATES PATENT OFFICE

DORA P. GLEASON, OF WHITE PLAINS, NEW YORK

UTENSIL

Application filed November 15, 1930. Serial No. 495,833.

This invention relates to improvements in utensils and more particularly to improvements in utensils designed especially for use in connection with cooking.

During the preparations of food by cooking it is necessary to make use of spoons for stirring, etc., forks and other utensils which are often times rested when not in use upon a table or other support at some distance from the stove. This practice necessitates the expenditure of unnecessary steps resulting in the loss of time, and of labor.

An object of the present invention is to provide a new, simple, efficient and inexpensive receptacle for kitchen tools, which receptacle may be placed upon a stove at which the tools are to be used or immediately adjacent thereto.

In carrying out the invention, use is made of a receptacle of special design and construction which is adapted particularly to the reception of kitchen tools of various character made use of during cooking. A preferred form of the receptacle consists briefly of bottom, side and end walls with the bottom provided with a curved ridge of increasing height from one end thereof to the other, which ridge is provided with an extension shaped into the form of a handle. By necessity, this extension or prolongation bisects one end of the receptacle, resulting in two end members at this particular end, each of which may be provided with one or more recesses into which the handles of the various tools may be fitted. Depending from the end of the receptacle having the handle affixed thereto are a pair of legs which serve to lift that end of the receptacle so that a slanting bottom is obtained. The ridge itself serves more or less to divide the receptacle into two compartments. For purposes of simplicity of structure the entire device including the handles is preferably, but not necessarily, made of a single sheet of metal so punched and shaped as to form the desired device.

Other features and objects of the invention will become apparent by consideration of the following detail description, together with accompanying drawings, forming a part of the same, wherein Figure 1 is a perspective view of one form of the invention;

Figure 2 is a section taken on substantially the lines 2—2 of Figure 1;

Figure 3 is a section taken on substantially the lines 3—3 of Figure 1;

Figure 4 is a plan view of a part of a modification of the invention, and

Figure 5 is an enlarged section taken on substantially the lines 5—5 of Figure 4.

Referring now to the drawings, 10 indicates a receptacle made up in accordance with the invention, such receptacle being composed of a bottom 11, side members 12 and 13 and an end member 14. As shown clearly in Figure 1, the bottom 11 is provided with a curved ridge 15 of increasing height from the end 14 to the opposite end. The material of which the bottom 11 and ridge 15 is formed is of such shape as to provide an extension or prolongation 16 which may be formed into the shape of a handle. This material forming the ridge and handle of necessity bisects one end of the receptacle so that this end is closed by means of end members 17 and 18.

In the embodiment shown in Figure 1, a pair of legs 19 and 20 are shown depending from the respective end members 17 and 18. These end members are also provided with recesses 21 and 22, for the reception of the handles of various kitchen tools.

In the construction of the device as briefly described hereinbefore, use may be made of a single sheet of metal so shaped that the two sides 12 and 13 may be formed extending upwardly at approximately 90 degrees and likewise the end 14 also formed to extend upwardly at approximately the same angle. The material of which the end 14 is formed is provided with extensions 25 which are folded around the outside of the sides 12 and 13 and secured thereto by welding, soldering or any other convenient manner. The ridge 15 may be formed by pressing by means of a die or in any other fashion. The legs 19 and 20 are formed by extensions of the bottom 11 as indicated in Figure 2, wherein the double pieces are shown at 26. The outer layer is continued upwardly to form the respective end members 17 and 18. These end members are likewise provided with extensions 27 folded around the outside of the sides 12 and 13 and secured thereto in the same manner as extensions 25.

In order that substantially no rough surfaces be exposed, an extra tab of material is provided to be folded around the outside of each of the legs 19 and 20, thereby providing a rounded surface, as shown at 28. In furtherance of this purpose, the upper edges of each of the side and end members may be rolled, as shown at 29. Tabs 30 are shown as folded over the outside of the members constituting legs 19 and 20 to lock the same together. The recesses 21 and 22 are formed by cutting and folding tabs 31 downwardly.

The use of the receptacle as hereinbefore described is substantially as follows: The receptacle may be placed upon an apron of a stove or on any other plane surface immediately adjacent the stove, in such position as to be convenient to the user. If so desired, water may be introduced into the receptacle, as shown in Figure 2, and in this instance the water will remain mostly in that portion of the receptacle adjacent to end 14. This is due to the fact that the legs 19 and 20 serve to lift the end of the receptacle having the handle, thereby imparting a slant to the bottom 11. In this position spoons, forks or other tools used during cooking may be placed in the receptacle, the handles being deposited in the respective recesses 21 and 22. By the use of water it is possible to have a clean tool at any time needed and, furthermore, the water prevents grease, gravies, batters, etc. from becoming caked on the tools.

The modification shown in Figures 4 and 5 is very similar to that shown in Figures 1 to 3 inclusive with the exception that the legs 19 and 20 are omitted, the material of the bottom 11 being folded upwardly to form ends 17 and 18 without the depending overlapped portions 26. Legs, however, are provided for the receptacle in this modification, such legs being shown at 40 and 41 as being punched from the bottom 11 and shaped as continuations of the ridge 15. In other respects the receptacle is the same, the ends 17 and 18 being provided with the recesses 21 and 22 and the sides and other end members being formed of the same sheet of material.

The use of the device shown in the modification is substantially the same as that before explained, the only care to be taken residing in the fact that if water be used, the quantity used must be such as not to extend up the bottom 11 to the openings 42 and 43 formed during the punching and shaping of legs 40 and 41.

From the foregoing, it will be seen that the present invention provides a receptacle especially adaptable for use during cooking, in which receptacle the various kitchen tools may be deposited for convenient access, thereby reducing the amount of steps and other labor ordinarily involved. In furtherance of the idea involved herein, it is to be understood that the invention is not to be limited to the two embodiments set forth in the drawings but is to be limited only by the following claims.

I claim:

1. A receptacle of the character described comprising a bottom, sides and ends, a portion of said bottom being curved upwardly at a progressively increasing angle to divide said receptacle, said curved portion being provided with a prolongation beyond the end of the receptacle forming a handle therefor, and means depending from one end of the receptacle to tilt the bottom thereof when the receptacle rests on a plane surface.

2. A receptacle of the character described comprising a bottom, sides and end members integral therewith, said bottom being deformed into an upstanding ridge substantially centrally thereof, a prolongation of said ridge forming a handle, one of said end members being cut away to permit passage of said ridge, and legs at one end of the receptacle integral with said bottom.

3. A receptacle of the character described comprising a bottom, side and end members integral therewith, said bottom being deformed into an upstanding ridge of increasing height from one end to the other, a prolongation of said ridge forming a handle dividing one of said ends into two parts, and legs depending from one end of the receptacle in the plane of said divided end parts and formed integrally therewith.

4. A receptacle of the character described comprising a bottom, side and end members integral therewith, said bottom being deformed into an upstanding ridge of increasing height from one end to the other, a prolongation of said ridge forming a handle dividing one of said end members into two parts, and legs extending from one end of the receptacle and formed as tabs punched from the bottom and shaped as continuations of the lower edges of said ridge.

5. A receptacle of the character described comprising a bottom, sides and end members integral therewith, said bottom being deformed into an upstanding ridge substantially centrally thereof, and a prolongation of said ridge forming a handle, one of said end members being cut away to permit passage of said ridge.

DORA P. GLEASON.